(12) United States Patent
Avdeev et al.

(10) Patent No.: US 7,374,653 B2
(45) Date of Patent: May 20, 2008

(54) METHOD FOR PRODUCING OXIDISED GRAPHITE

(75) Inventors: Viktor Vasilievich Avdeev, ul. Akademika Bakuleva, d. 8, kv, 20, Moscow (RU) 117513; Alexandr Ivanovich Finaenov, Saratov (RU); Nataliya Evgenievna Sorokina, Moscow (RU); Vladimir Vasilievich Krasnov, Engels (RU); Andrey Vasilievich Yakovlev, Saratov (RU); Sergey Gennadievich Ionov, Moscow (RU); Vladimir Akekseyevich Sezemin, Kirovo-Chepetsk (RU); Aleksey Vladimirovich Sezemin, Kirovo-Chepetsk (RU); Nataliya Vladimirovna Maksimova, Moscow (RU); Irina Viktorovna Nikolskaya, Moscow (RU)

(73) Assignee: Viktor Vasilievich Avdeev, Moscow (RU)

( * ) Notice: Subject to any disclaimer, the term of this patent is extended or adjusted under 35 U.S.C. 154(b) by 111 days.

(21) Appl. No.: 11/333,628

(22) Filed: Jan. 13, 2006

(65) Prior Publication Data

US 2006/0180477 A1    Aug. 17, 2006

Related U.S. Application Data

(63) Continuation of application No. PCT/RU2004/000267, filed on Jul. 13, 2004.

(30) Foreign Application Priority Data

Jul. 14, 2003   (RU) .............................. 2003121292

(51) Int. Cl.
   *C25B 1/00* (2006.01)

(52) U.S. Cl. ................. 205/555; 205/687; 205/768
(58) Field of Classification Search ............... 205/555, 205/687, 768
   See application file for complete search history.

(56) References Cited

U.S. PATENT DOCUMENTS

| 4,350,576 A | 9/1982 | Watanabe et al. | |
| 6,406,612 B1 * | 6/2002 | Greinke | 205/555 |
| 6,756,027 B2 * | 6/2004 | Barsukov et al. | 423/448 |

FOREIGN PATENT DOCUMENTS

| GB | 2367291 | 4/2002 |
| RU | 2083723 C1 | 7/1997 |
| RU | 2142409 C1 | 12/1999 |
| SU | 1614350 A1 | 2/1995 |

* cited by examiner

Primary Examiner—Arun S. Phasge
(74) Attorney, Agent, or Firm—Houston Eliseeva LLP

(57) ABSTRACT

This invention relates to technology of carbographite materials, in particular, to production of oxidized graphite for making low foaming temperature foamed graphite, which is used for manufacturing flexible foil, fireproof materials, water-purification sorbents, materials for cleaning up spills of petroleum products, and so on. The method for producing oxidized low foaming temperature graphite comprises the stages of (a) preparing a mixture based on graphite particles and at least one aqueous solution of an acid; (b) activating the surface of said graphite particles to produce acid-containing functional groups on the surface of the particles; (c) treating the graphite particles to produce a graphite intercalation compound; (d) washing said compound with water; (e) drying said compound, and heat-treating it to produce foamed graphite, wherein stage (b) and (c) are carried out by electrochemical treatment at a quantity of electricity within 300 to 600 mA·hour/g of graphite. The technical result is oxidized graphite having improved characteristics, in particular, high uniformity, low bulk density, and capacity for foaming at temperatures of 150° C. to 260° C.

10 Claims, 2 Drawing Sheets

METHOD FOR PRODUCING OXIDISED GRAPHITE

RELATED APPLICATIONS

This application is a continuation application of PCT application PCT/RU2004/000267 filed on Jul. 13, 2004 and designating the US (which was published as International Publication No. WO 2005/007573) which in turn claims priority to Russian patent application number RU2003121292 filed on Jul. 14, 2003, both of which are incorporated herein by reference in their entirety.

BACKGROUND OF THE INVENTION

This invention relates to techniques for producing carbographite materials, and in particular, to production of oxidized graphite having a low foaming temperature for making foamed graphite, which is used for manufacturing flexible foil and water-purification sorbents, materials for cleaning up spills of petroleum products, making fireproof materials, and so on.

BACKGROUND OF THE INVENTION

Oxidized graphite is a product of hydrolysis of graphite intercalation compounds (GIC) with strong inorganic acids, for example, sulfuric or nitric acid.

Oxidized graphite is used as a base for producing foamed graphite, which is a very light-weight, chemically inert material that is essentially a heat-expanded graphite.

This material is obtained by rapidly heating oxidized graphite.

Oxidized graphite may be obtained by treating graphite in aqueous solutions of strong acids, for example, sulfuric or nitric acid, in the presence of oxidizing agents, or by electrochemical treatment.

To achieve a foaming effect, oxidized graphite is subjected to heat treatment at a temperature in the order of 900-1,000° C.

For example, U.S. Pat. No. 4,350,576 discloses a method for producing foamed graphite, comprising electrochemical processing by anodic oxidation of graphite in aqueous solutions of $H_2SO_4$ or $HNO_3$ at a constant current density of less than 500 mA/cm$^2$ for 6 to 7 hours, followed by washing with water, drying, and heat treatment.

The bulk density of foamed graphite obtained by this method is between 4 and 6 g/liter.

This known method is disadvantageous because of the considerable duration of electrochemical treatment, non-uniformity of the end product, unsatisfactory bulk density of the product, and absence of foaming capacity at relatively low temperatures (150-250° C.).

A number of publications that have come out in recent years disclose production of oxidized graphite, which has a low foaming temperature, for manufacturing foamed graphite. In particular, GB Patent No. 2,367,291 describes a method for producing oxidized graphite, which comprises preliminary treatment of feedstock graphite in organic acids of the general formula $H(CH_2)_n COOH$, wherein n takes values of 0 to 5, followed by electrochemical treatment in an aqueous solution of 30-50% $H_2SO_4$ at a constant current density of up to 0.06 A/cm$^2$, washing with water, drying, and heat treatment. Accordingly, the patent discloses a foamed graphite produced by this method at a bulk density of 3-5 g/liter. The foamed graphite is capable of foaming at low temperatures.

This known method is disadvantageous because the use of organic compounds at the preliminary treatment stage complicates the method significantly since it requires the use of additional equipment capable of distributing a small quantity of organic additive over the entire mass of feedstock graphite. But even in that case, the probability of the feedstock and, therefore, foamed graphite being non-uniform is very high. Besides, this processing method creates a problem of mixed acidic waste disposal, adding to the costs of the method.

SUMMARY OF THE INVENTION

The present invention provides oxidized graphite having improved characteristics, in particular, a high uniformity, low bulk density, and foaming capacity at temperature up from 150° C., and to raise the yield of the process by reducing the duration of electrochemical treatment. This graphite is particularly suitable for fire-resistant products (for example, in cable wiring, fire-retardant couplings, and so on), because the low foaming temperature allows compounds effectively extinguishing ignition on initiation to be developed.

This object is achieved by a method for producing oxidized graphite with a low foaming temperature for manufacturing foamed graphite, which method comprises the stages of (a) preparing a mixture of graphite particles and at least one aqueous solution of a strong acid; (b) activating the surface of said graphite particles to form acid-containing functional groups on the surface thereof; (c) conducting further treatment to produce a graphite intercalation compound; (d) washing said compound with water; and (e) drying the same, stages (b) and (c) being conducted by electrochemical anodic treatment at a total quantity of electricity of at least 200 mA·hour/g of graphite.

In the particular embodiments of this invention, the above object is achieved by a method, in which stages (b) and (c) are carried out in a continuous process at a total quantity of electricity of 300 to 600 mA·hour/g of graphite.

Stage (e) may be followed by heat treatment of the oxidized graphite at a temperature of 150-260° C. to produce foamed graphite.

Stages (b) and (c) may be performed in a potentiostatic or galvanostatic mode, in which case stage (b) is preferably to be conducted at up to 20% of the total quantity of electricity.

Where stages (b) and (c) are carried out in a potentiostatic mode, stage (b) is conducted at a potential exceeding the potential at stage (c) by at least 10%.

If that is the case, stages (b) and (c) may be carried in an aqueous solution of sulfuric acid at a concentration of 40% to 80% at a total quantity of electricity of 300 to 500 mA·hour/g of graphite, stage (b) being conducted at a potential of between 1.8 and 2.3 V, and stage (c), at a potential of between 1.6 and 2.0 V.

In that case, too, it is possible to carry out stages (b) and (c) in an aqueous solution of nitric acid at a concentration of 20% to 58% at a quantity of electricity of 300 to 500 mA·hour/g of graphite, stage (b) being conducted at a potential of 2.1 to 2.5 V, and stage (c), at a potential of 1.5 to 1.8 V If stages (b) and (c) are carried out in a galvanostatic mode, stage (b) is performed at a current exceeding the current at stage (c) by at least 10%.

In that case, stages (b) and (c) are carried out in an aqueous solution of sulfuric acid at a concentration of 40% to 80% at a total quantity of electricity of 300 to 500 mA·hour/g of graphite, stage (b) being conducted at a current of 80-160 mA/g of graphite until a potential of not more than 2.5 V is reached, and stage (c) being conducted at a current of 40-80 mA/g of graphite until a potential of not more than 2.3 V is reached.

The object of this invention is also reached by a method for producing oxidized graphite with a low foaming temperature for manufacturing foamed graphite, said method comprising the stages of (a) preparing a mixture of graphite particles and at least one aqueous solution of nitric acid at a concentration of 20% to 58%; (b) conducting preliminary electrochemical treatment of the graphite particles in an aqueous solution of nitric acid to activate the graphite surface; (c) conducting a main stage of electrochemical treatment of said graphite particles in an aqueous solution of nitric acid; (d) washing said particles with water; and (e) drying the product, stages (b) and (c) being conducted at a constant anode potential at a quantity of electricity of 300-500 mA·hour/g of graphite.

The drying stage is followed by heat treatment of oxidized graphite at a temperature of 150-260° C.

Stage (b) is conducted at a potential of 2.1-2.5 V for 10 to 600 seconds, and stage (c) is completed at 1.5 to 1.8 V within 3 to 7 hours.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 4:
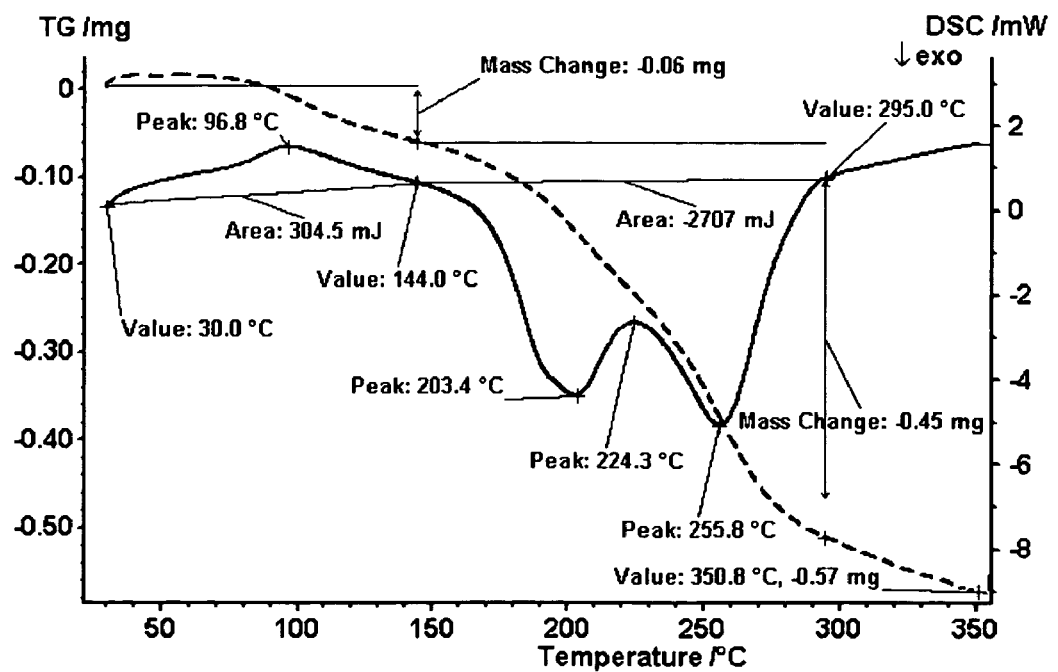
FIG. 4 shows a DSC-TG curve of a sample of oxidized graphite produced by electrochemical oxidation of graphite in 58% nitric acid.

FIG. 4 shows a DSC-TG curve of a sample of oxidized graphite produced by electrochemical oxidation of graphite in 58% nitric acid.

The essense of this invention is as follows:

We have established, as a result of studies we have conducted, that oxidized graphite produced in aqueous solutions of strong acids ($HNO_3$ and $H_2SO_4$), subject to preliminary surface activation, followed by washing with water and drying, is capable of expanding at temperatures starting at 150° C. up.

Synthesis of heat-expanded compounds at a reduced foamed graphite production temperature is specific in that formation of graphite intercalation compounds (GIC) is accompanied by release of oxygen at a relatively low rate. The oxygen thus released can, while in an adsorbed atomic state preceding the recombination stage, interact with the surface carbon of graphite particles and accumulate in the form of acid-containing functional groups.

Figure 1:
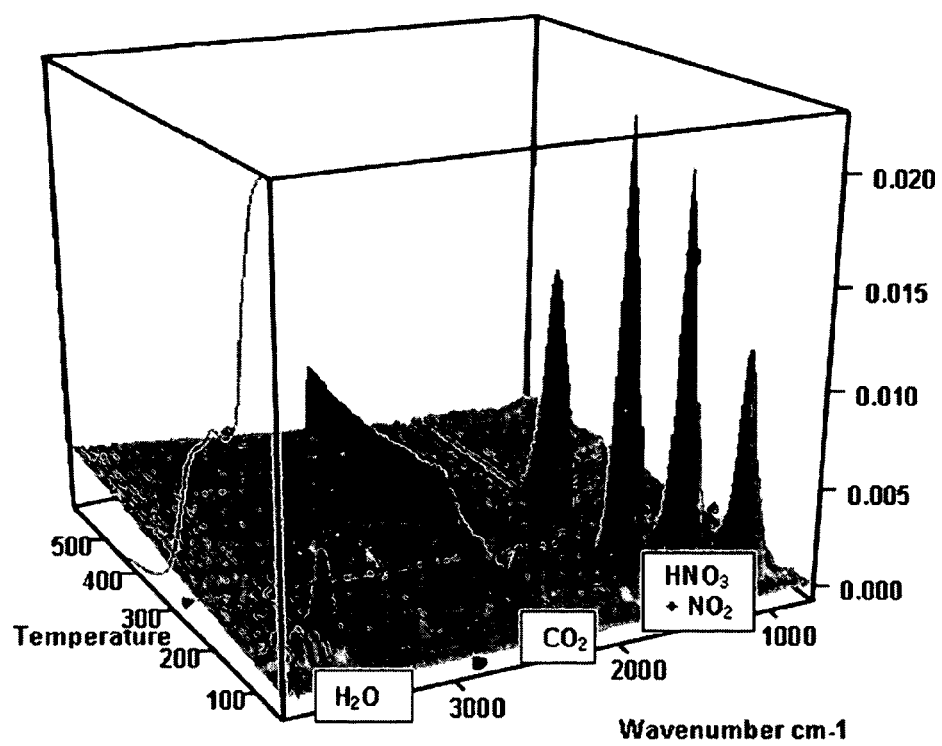
FIG. 1 shows details of the infrared (IR) spectrum of the gaseous phase evolving upon decomposition of a sample of oxidized graphite produced by electrochemical oxidation of graphite in 58% nitric acid.

This fact is supported by the results of IR spectroscopy of evolving gases (FIG. 1). At the beginning, decomposition of oxidized graphite is accompanied by liberation of the vapor gas phase ($CO_2$ and $H_2O$), which is a foaming agent.

No oxygen can be released unless water molecules are adsorbed on graphite surface. Adsorbed water is also involved in intercalation processes as it intercalates together with acid anions. Oxygen intruding into interlayer spacings of the graphite matrix as part of the intercalating agent is capable of forming covalent bonds with carbon atoms, and partially deforming the polyarene lattices.

Accumulation of oxygen on graphite surface and its presence in the intercalating agent result in CO and $CO_2$ beginning to evolve at temperatures in the range of 130-180° C. Moreover, blocking of interlayer spacings on particle surface and partial deformation of carbon layers increase the efficiency of foaming agents.

Formation of foamed carbon structures during heat treatment is stimulated by the removal of surface groups that causes lamination and deformation of carbon lattices, facilitating complete rupture thereof under the effect of thermolysis products of the intercalating agent.

Figure 2:
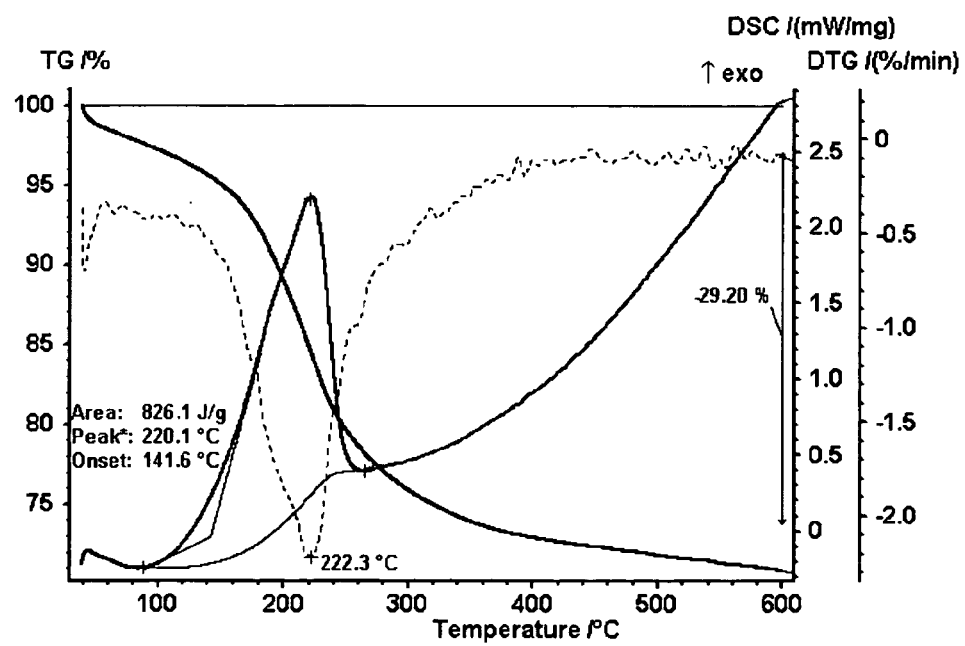
FIG. 2 shows a DSC-TG curve of a sample of oxidized graphite produced by electrochemical oxidation of graphite in 70% $H_2SO_4$.
Figure 3:
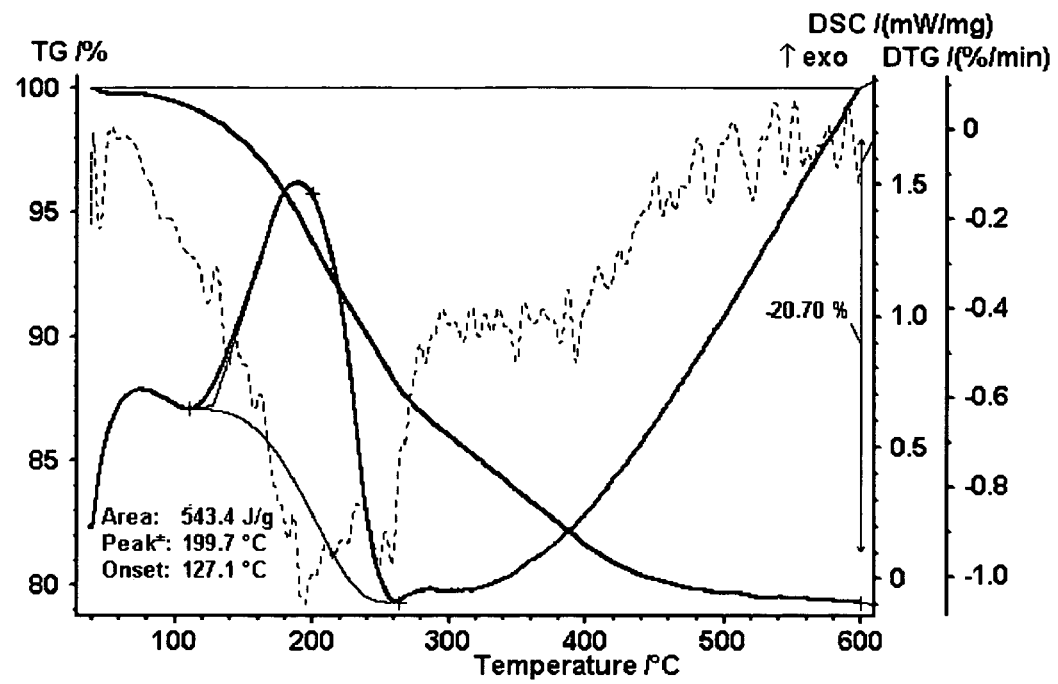
FIG. 3 shows a DSC-TG curve of a sample of oxidized graphite produced by electrochemical oxidation of graphite in 80% $H_2SO_4$.

Available thermoanalysis data (synchronous thermoanalyzer from NETSZCH STA 449c Jupiter) clearly indicate that the temperature at which decomposition and, therefore, expansion begin in a product obtained in 80% sulfuric acid is 127.5° C., 70% sulfuric acid—140.2° C., and 58% nitric acid—144° C. (see FIGS. 2 to 4).

An important distinction of oxidized graphites produced by electrochemical treatment in aqueous solutions of acids, preceded by surface activation, is that the DSC (differential scanning calorimetry) curve shows exo-effects typical of graphite oxide, while oxidized graphites produced by a traditional method in concentrated acids are only characterized by endo-effects upon decomposition, at a decomposition onset temperature of more than 200° C.

When small quantities of electricity (Q<200 mA·hour/g of graphite) are used at stages (b) and (c), the quantity of oxygen in the compounds is insufficient, and it is impossible to complete electrochemical treatment of the structure of the entire graphite body.

With Q>600 mA·hour/g of graphite, the carbon yield drops sharply, because a significant proportion of carbon (up to 30%-40%) is vaporized in the form of CO and $CO_2$. Moreover, it is irrational to increase Q any further because of high electric power requirements.

Both kinds of treatment—surface activation at stage (b) and treatment to produce GIC at stage (c)—are carried out in a single continuous process.

Experiments have shown that anodic treatment of graphite in diluted aqueous solutions of acids, for example, sulfuric or nitric acid, at a constant potential and quantity of electricity of at least 200 mA·hour/g of graphite results in the formation of transitional forms from graphite nitrate or bisulfate to graphite oxide (GO) of non-stoichiometric composition.

A significant role at stage (b) is played by water electrolysis to release atomic oxygen that fails to recombine into its molecular form in these conditions and has a very strong effect on graphite. For this process to occur, it is enough to use up to 20% of the total quantity of electricity.

For the surface of graphite particles to be activated (stage (b)), it is required to carry out this preliminary stage at up to 20% of the total quantity of electricity and conduct treatment at higher potentials than are used at main stage (c) (in the case of a potentiostatic mode), or at higher current values (in the case of a galvanostatic mode), to quickly prepare the graphite matrix (charging of the double electric layer, surface oxidation, and formation of oxygen-containing functional groups) for subsequent intercalation (main stage (c)).

For example, potential $E_b$ exceeding potential $E_c$, at which the main treatment stage is carried out, by 10% to 70%, is to be maintained for a relatively short time interval at stage (b), at the beginning of graphite oxidation in the potentiostatic mode.

When the process is conducted in a galvanostatic mode, activation at stage (b) is carried out by using high current values, up from 80-160 mA/g of graphite, and stage (c) is carried out at lower, approximately, by half, current values.

Water present in nitric or sulfuric acid has a positive effect on the synthesis of these intermediate non-stoichiometric compounds having an elevated content of oxygen on the solid phase surface in the form of surface functional groups

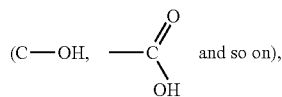

and also inside the intercalation layer.

Optimal conditions for producing foamed graphite having a low bulk density at a foaming temperature within 150-260° C. are created at stages (b) and (c) of anodic treatment in $H_2SO_4$ at a 40% to 80% concentration or in $HNO_3$ at a 20% to 58% concentration by weight.

Higher acid concentrations result in traditional graphite intercalation compounds being produced, without the vigorous effect of atomic oxygen or accumulation of surface functional groups responsible for foaming at temperatures up from 150° C. Concentrated solutions contain little water, for which reason release of active oxygen and intercalation of water molecules into the graphite matrix are slowed down, allowing transitional compounds and graphite oxide incapable of "low-temperature" foaming to be formed.

Reducing acid concentrations below the values claimed is undesirable either, because that would require the quantity of electricity (Q) applied to be increased and the potential raised, and would stimulate more active hydrolysis of resulting intercalation compounds and have a negative effect on the properties of foamed graphite.

Oxidized graphite produced in accordance with this invention in a process to manufacture foamed graphite is capable of foaming at a relatively low heat treatment temperature, up from 150° C.

A further distinctive feature of this invention is that graphite of a broad particle size range may be used as graphite feedstock.

Good results were obtained from graphite having a particle size under 0.3 mm, which allow cheaper graphite grades to be used for producing oxidized graphite and foamed graphite on the basis thereof.

The invention will be illustrated with reference to the following examples:

EXAMPLE 1

An electrolytic cell comprising a reaction anode chamber between the anode lead and a movable piston with a diaphragm, and a cathode placed in electrolyte over the piston is loaded with 25 ml of 58% $HNO_3$ and 10 g of natural graphite of the following particle sizes: 80% of 200-290 microns and 20% under 200 microns, and the graphite is subjected to anodic treatment in the potentiostatic mode. Potential $E_b$=2.1 V is applied at stage (b) (surface activation) for 15 seconds. Thereupon, stage (c) of electrochemical treatment is conducted to produce a GIC at potential $E_c$=1.75 V for 5 hours at Q=400 mA·hour/g of graphite. A pressure of 0.2 kg/cm² is applied to the piston. The resultant product is then washed with water, dried, and subjected to heat treatment at 200° C., to give heat-expanded graphite having a bulk density of 1.7 g/liter.

EXAMPLES 2-4

Anodic treatment is carried out in an acid at a concentration of 35% to 40% in two stages, with Q varying from 300 to 420 mA·hour/g of graphite and foaming temperatures of 200-250° C. The graphite thus treated has an average particle size of 200 microns.

Treatment conditions and results obtained in Examples 2-4 are shown in Table 1.

EXAMPLE 5

The reaction chamber of an electrolytic cell placed between the anode and cathode having a tightly fitting separator made from polypropylene fabric is loaded with 2 kg of a mixture of graphite and 80% sulfuric acid at a ratio of 1:1.6.

The graphite suspension is subjected to anodic treatment in the galvanostatic mode. Stage (b) (surface activation) is carried out at a current of 160 mA/g of graphite as the anode potential reaches a value of $E_b$=2.3 V (for about 2 hours), and then, as the current is reduced to about 80 mA/g of graphite, stage (c) (formation of GIC) is carried out. Electrolytic cell voltage varies within 3.5 to 4.5 V during the synthesis. The total treatment time is 9 hours, Q=450 mA·hour/g of graphite. The pressure on the piston is 0.2 kg/cm².

The resultant product is then washed with water, dried, and heat-treated at 250° C. to give graphite having a bulk density of about 1.6 g/liter.

EXAMPLE 6

Anodic treatment of a graphite suspension with 70% sulfuric acid at a ratio of 1:1.6 is carried out as in Example 5, with current gradually reduced after a potential of 2.1 V has been reached, and stage (c) starting at E=1.8 V.

The total treatment time increases to 10 hours, at Q=520 mA·hour/g of graphite.

The resultant product is then washed with water, dried, and heat-treated at 200° C. to yield graphite having a bulk density of 2.0 to 2.2 g/liter.

EXAMPLE 7

Anodic treatment of a graphite suspension with 60% sulfuric acid at a ratio of 1:1.5 is carried out as in Example 5, except that starting polarization current at the activation stage is 80 mA/g of graphite, and is gradually reduced after a potential of 1.9-2.0 V has been reached, the treatment continuing at E=1.7 V and current of 40 mA/g of graphite.

The total treatment time rises to 12 hours, at Q=480-500 mA·hour/g of graphite.

The resultant product is then washed with water, dried, and heat-treated at 200° C. to yield graphite having a bulk density less than 2.2 g/liter

EXAMPLE 8

Anodic treatment of a graphite suspension with 50% sulfuric acid at a ratio of 1:1.5 is carried out as in Example 7, except that current is gradually reduced after a potential of 1.8-1.9 V has been reached, the treatment continuing at E=1.6 V and current of 40 mA/g of graphite.

The total treatment time rises to 14 hours, at Q=450-480 mA·hour/g of graphite.

The resultant product is then washed with water, dried, and heat-treated at 200° C. to yield graphite having a bulk density of 2.9 g/liter

TABLE

| | Concentration of HNO3, | Surface activation (b) | | Main stage (c) | | | Bulk density dFG, g/liter (foaming |
|---|---|---|---|---|---|---|---|
| Run Number | % by weight | Eb, V | Tb, sec. | Ec, V | Tc, hour | Q mA·hour/g of | temperature, ° C.) |
| 2 | 35 | 2.1 | 600 | 1.75 | 4 | 335 | 1.5 (200) |
| 3 | 35 | 2.5 | 10 | 1.65 | 6 | 420 | 2.2 (220) |
| 4 | 40 | 2.7 | 300 | 1.7 | 3 | 300 | 2.5 (160) |

The foregoing examples and data in the table above illustrate the following obvious advantages of this invention:

Foaming is possible at temperatures within the 150-250° C. range.

Low bulk density is achieved.

Inexpensive graphite grades having a particle size in the order of 200 microns are used for producing foamed graphite, reducing the costs of the process significantly.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of producing oxidized graphite having a low foaming temperature in a temperature range from 150° C. to 260° C. for manufacturing foamed graphite, comprising carrying out the stages of:
   (a) preparing a mixture based on graphite particles and at least one aqueous solution of a strong acid;
   (b) activating the surface of said graphite particles to form oxygen containing functional groups on the surface of the graphite particles;
   (c) treating the graphite particles to obtain a graphite intercalation compound;
   (d) washing said intercalation compound with water; and
   (e) drying said intercalation compound;
   wherein stages (b) and (c) are carried out by electrochemical anodic treatment at a total quantity of electricity of at least 200 mA·hour/g of graphite, stage (b) is carried out at up to 20% of a total quantity of electricity with a current or potential at least 1.1 times higher than that of stage (c).

2. The method according to claim 1, wherein stages (b) and (c) are carried out in a continuous process at the total quantity of electricity ranging from 300 to 600 mA·hour/g of graphite.

3. The method according to claim 1, wherein stage (e) is followed by heat treating the oxidized graphite at a temperature ranging from 150 to 260° C.

4. The method according to claim 1, wherein stages (b) and (c) are carried out in a potentiostatic or galvanostatic mode at a quantity of electricity from a range of 300 to 500 mA·hour/g of graphite.

5. The method according to claim 4, wherein stages (b) and (c) are carried out in a potentiostatic mode, and wherein stage (b) is carried out at a potential from a range of 1.7 to 2.6 V, and stage (c) is carried out at a potential from a range of 1.5 to 2.0 V.

6. The method according to claim 5, wherein stages (b) and (c) are carried out in an aqueous solution of sulfuric acid at a concentration of 40% to 80%, stage (b) being carried out at a potential from a range of 1.8 to 2.3 V, and stage (c), being carried out at a potential from a range of 1.6 to 2.0 V.

7. The method according to claim 5, wherein stages (b) and (c) are carried out in an aqueous solution of nitric acid at a concentration of 20% to 58%, stage (b) being carried out at a potential from a range of 2.1 to 2.5 V, and stage (c) being carried out at a potential from a range of 1.5 to 1.8 V.

8. The method according to claim 4, wherein stages (b) and (c) are carried out in an aqueous solution of sulfuric acid at a concentration from a range of 40% to 80%, stage (b) being carried out at a current from a range of 80 to 160 mA/g of graphite until a potential of up to 2.5 V is reached, and stage (c) being carried out at a current from a range of 40 to 80 mA/g of graphite until a potential of up to 2.3 V is reached.

9. A method for producing oxidized graphite having a low foaming temperature in a temperature range from 150° C. to 260° C. for manufacturing foamed graphite, comprising carrying out the stages of:
   (a) preparing a mixture based on graphite particles and at least one aqueous solution of nitric acid at a concentration of 20% to 58%;
   (b) carrying out a preliminary stage of electrochemical anodic treatment of said graphite particles in the aqueous solution of nitric acid to activate a graphite surface;

(c) carrying out a main stage of electrochemical anodic treatment of said graphite particles in an aqueous solution of nitric acid;
(d) washing said graphite particles with water; and
(e) drying said particles, wherein stages (b) and (c) are carried out at a constant anode potential at a total quantity of electricity of 300 to 500 mA·hour/g of graphite, wherein stage (b) is carried out at a potential of 2.1 to 2.5 V for 10 to 600 seconds, and stage (c), at a potential of 1.5 to 1.8 V for 3 to 7 hours.

10. The method according to claim 9, wherein stage (e) is followed by heat treatment of the oxidized graphite at a temperature of 150-260° C.

* * * * *